UNITED STATES PATENT OFFICE.

ARTHUR C. SPENCER, OF WASHINGTON, DISTRICT OF COLUMBIA.

PROCESS OF TREATING ZINC TAILINGS.

1,150,897. Specification of Letters Patent. Patented Aug. 24, 1915.

No Drawing. Application filed April 22, 1909. Serial No. 491,577.

*To all whom it may concern:*

Be it known that I, ARTHUR C. SPENCER, a citizen of the United States, residing at Washington, in the District of Columbia, have invented certain new and useful Improvements in Processes of Treating Zinc Tailings, of which the following is a full, clear, and exact description, such as will enable others skilled in the art to which it appertains to practise and make the same.

This invention relates to processes of treating zinc tailings, and it comprises a method of treating calcite-containing tailings from the treatment of zinc ores of the franklinite type wherein such tailings are calcined in a traveling stream under oxidizing conditions and at a temperature at least sufficient to calcine the calcite components thereof, forming lime, and the contained zinc compounds are thereafter separated from the lime; all as more fully hereinafter set forth and as claimed.

Zinc ores of the character of those occurring in the deposits at Franklin Furnace, Sussex county, New Jersey, comprise various anhydrous zinc compounds, such as franklinite (magnetite having a portion of the FeO replaced by ZnO and MnO), willemite, or zinc silicate, zincite, etc., in a calciferous gangue; this gangue usually consisting of a calcite-like mineral having more or less of the CaO replaced by MnO, MgO, etc. A typical sample of such an ore may contain, for instance, 49 per cent. franklinite, 29 per cent. willemite, 3 per cent. zincite, 10 per cent. of a calciferous gangue containing manganese and 9 per cent. of various silicates. Ore of this type at present is commonly treated by coarsely crushing, say to a maximum granule size of a tenth-inch, and magnetically separating in one or more stages, to remove the franklinite, which is sent to a metallurgical plant to furnish zinc oxid and cinder, the latter being ultimately used to make spiegeleisen. Operating in two stages, the first separation is of comparatively pure franklinite and the second of a material which is called "half and half" because it contains both franklinite and willemite. Both products are sent to the zinc oxid plant. The non-magnetic material coming from the separators is subjected to further treatment to recover willemite and zincite. It consists essentially of granules of these materials mixed with granules of calcite and certain complex silicates; but the material is still so coarse that some of the granules comprise two or more minerals. The further treatment usually consists in separation by methods depending on differences in specific gravity of the various minerals present, as by the use of jigs, shaking tables and the like. The product of this separation is spelter ore (so-called "willemite") consisting essentially of willemite mixed with zincite (red zinc ore), etc. The tailings consist mainly of manganiferous calcite gangue and silicates, but commonly they still contain upward of 5 per cent. of zinc existing in various zinc minerals in such form and condition that further separation by physical means, such as jigging, is impracticable. These tailings may be utilized as sand for making concrete and for like purposes, but the metal which they carry is wasted.

I have discovered that by treating these tailings in certain hereinafter specified ways I can recover much of the zinc mineral which is now cast aside and also produce valuable by-products. By calcining these tailings in such a manner as to remove at least a part, and preferably substantially all, of the contained carbon dioxid from the calcite component under certain hereinafter described conditions, the lime which is formed may be readily removed and recovered as a valuable product while in such calcination under the described conditions, the lime does not seriously affect the other valuable components of the material under treatment. For these purposes, the use of the ordinary types of lime-burners, such as the vertical stack kilns is impracticable, both because the physical condition of the material does not permit it and because it is undesirable to have fuel in direct contact with the material.

In the treatment of lump ore in an ordinary kiln, the particles of lime or calcite being in actual contact with the particles of the zinc minerals, such as the silicate, are enabled to act upon them to a greater or less extent. In working with these zinc tailings for the present purposes it is desirable to have oxidizing conditions prevail; such as the presence of an excess of air or, at least $CO_2$. By passing the granular material however in a traveling stream or layer in proximity to flame and flame gases, the desired type of action upon the calcite component is attained without injurious effects upon the metalliferous components. In the crushing of the ore incidental to gravital separation, the various minerals are converted into small substantially separate and discrete granules, and there is thereafter no intimate contact between, for instance, a granule of calcite and a granule of willemite. In treating such a mixture of discrete granules as a traveling stream, each particle of mineral matter can be acted on separately and the several granules do not mutually react to any substantial extent. The temperature adopted must be high enough to calcine the calcareous component of the gangue and may be considerably higher, so as to deliver the lime in the form of "overburnt" granules, for reasons later appearing.

Where the calcination is merely enough to form lime of the ordinary properties, by adding merely enough water or steam to hydrate the lime, the lime breaks down in hydration to a very fine, dry powder, from which the relatively coarse zinc minerals may be recovered by a simple sifting, by aerial or pneumatic separation, etc. The dry lime hydrate so separated from Sussex county ores, is generally brown from the presence of manganese, and it may be sold for building purposes or it may be used as a component of a blast furnace charge if briqueted, nodulized or agglomerated as in making spiegeleisen, its manganese content and fluxing properties rendering it highly desirable for this purpose. Or it may be used as a fertilizer. The calcines may of course be slaked with sufficient water to produce milk of lime and this separated from the zinc minerals, but the former procedures are generally more desirable with material calcined to the degree stated because they allow the valuable hydrated lime to be more readily saved. When abundant water is used the milk of lime flows away and the mineral aggregate remaining may be jigged or tabled to separate more or less valuable components.

Another method of operation is to perform the calcination at a temperature high enough not only to produce quicklime from the calcareous gangue but to convert it into an "overburnt" form, reacting but very slowly or not at all with water. In doing this, with the described type of ore, the overburnt calcareous gangue forms granules of a brown color (because of the presence of manganese) which may be easily separated from the zinc minerals on the ordinary forms of shanking tables, in jigs, etc. The lime, being porous is light and readily separated even though there is no substantial formation of slaked lime. The lime granules recovered as tailings are in a form and of a composition, because of their manganese content, which makes them especially available for use for flux in manufacturing iron and spiegeleisen. Being granular and easily freed of moisture, the material is better for this purpose than the described very fine hydrated lime, though as already stated the latter may be thus utilized.

In performing the calcination, any type of apparatus capable of forming and maintaining a traveling stream of granular material or a plurality of such streams exposed to oxidizing and heating conditions may be employed. It is preferable that this stream or layer be relatively thin or shallow as compared with the cross-sectional area of the heating zone. The granular material may, for instance be passed as a traveling stream down through a rotary inclined kiln having flame producing means in the mouth or elsewhere and waste gas removing means at the upper end. Heating may be done by a flame of producer gas, generator gas, water gas, oil, powdered coal, etc., formed above the traveling stream of material and passing in the opposed direction. Tempered flames may be employed. Under the heat of the flame and the flame gases, the material is readily calcined to any degree desirable while the operation may be readily watched and controlled so as to produce the degree of calcination desired. As stated, the calcination may be carried to the point of "overburning" though a less degree of calcination may be employed. The material to be calcined being comparatively coarse, where the described tailings are treated, little dusting occurs and regenerative devices may be employed if desired. Another type of apparatus which may be usefully employed is a shaft-and-shelf furnace, the material to be calcined dropping down a vertical shaft and lodging more or less from point to point while flame and flame gases tempered or not and from any suitable source of flame are passed upward or downward through the apparatus. Here also regenerative devices may be introduced if desired.

In the calcination, any temperature above 700° C may be employed though it is desirable, and particularly in producing overburning, to work at a rather higher range, say for producing quicklime, around 950° C and for overburning, around 1050° C. Calcining temperatures, however, depend very much on the partial pressure of $CO_2$ in the atmosphere surrounding the calcining material, and therefore the calcination temperature may be reduced by reducing the total pressure in the calcining apparatus or by the use of steam or other inert gases. Steam further exercises a specific catalytic action in the decomposition of calcium carbonate. Where the calcareous component of the ore contains much manganese or magnesia the calcining temperature is also lowered.

The overburnt, brown, manganiferous lime granules from the described tailings from franklinite-willemite ore have about the size of the original gangue particles and do not slake materially with water. The zinc minerals separate from them readily by the ordinary types of gravital separation, the lime granules being of less specific gravity than the original gangue particles.

In one sample of franklinite tailings treated by the present method, the original tailings contained about 5 per cent. of zinc and 68 per cent. of manganiferous calcite or limestone. After calcination and separation, a product was obtained carrying about 15 per cent. of zinc. The separation on a shaking table was very easy and by adjusting the tables without reference to the light overburnt lime granules an adequate separation could easily be effected between the zinciferous minerals and the essentially worthless silicates. Working in this manner, concentrates can be produced carrying upward of 20 per cent. of zinc in one passage over the table. As previously stated, the calcination increases the magnetic qualities of the ore, and in the case of certain ore products, some of the constituents are rendered magnetic which were not so before, so that a magnetic separation of the calcined material is frequently useful before or after the gravital separations. Hydration of the lime also frees small particles of originally included franklinite which have been rendered magnetic by the heat treatment.

While I prefer a calcination complete enough to expel all, or substantially all, of the carbon dioxid present in the ore, it is obvious that any degree of calcination is useful for the described purposes. If the gangue granules be superficially calcined, on hydration they become reduced in size and separation of zinc minerals once more becomes practicable.

Where the tailings are to be treated by the present process, the separation of the original ore upon the jigs or tables may be carried out to yield cleaner concentrates than by present methods at the same time allowing more willemite to go over into the tailings. Since this willemite will be recovered by my process of treating the tailings, there is no loss but instead a distinct gain of metallic mineral saved while the quicker work gives a larger output and increased economy in the operation of the jigs or tables.

Calcination in the described traveling layer may be performed in any type of furnace internally or externally heated.

What I claim is:—

1. The process of recovering residual zinc minerals from calcareous final tailings coming from the concentrating treatment of ores of the franklinite-willemite type which comprises calcining such tailings under oxidizing conditions and separating the lime produced in calcination from the accompanying heavy minerals.

2. The process of recovering minerals from calcareous tailings coming from the treatment of ores of the franklinite-willemite type which comprises calcining such tailings under oxidizing conditions and at a temperature sufficient to overburn the lime, and separating the lime produced in calcination from the accompanying heavy minerals.

3. The process of recovering residual zinc minerals from calcareous final tailings coming from the concentrated treatment of ores of the franklinite-willemite type which comprises passing such tailings through a calcining zone against an opposing oxidizing current of flame and flame gases and thereafter separating the lime produced in calcination from the accompanying heavy minerals.

4. The process of recovering residual zinc minerals from calcareous tailings coming from the treatment of ores of the franklinite-willemite type which comprises passing such tailings through a calcining zone against an opposing current of oxidizing flame and flame gases at a temperature sufficient to overburn the lime produced and thereafter separating the lime produced in calcination from the accompanying heavy minerals.

5. The process of recovering minerals from ores containing calcareous gangue which comprises calcining the same in pulverized form under non-reducing conditions, at a temperature sufficient to overburn the lime, and subsequently separating the overburned lime from the minerals.

In testimony whereof, I affix my signature in the presence of witnesses.

ARTHUR C. SPENCER.

Witnesses:
J. H. SIGGERS,
K. P. McELROY.